March 14, 1933.  E. E. GUINNESS  1,901,098
VARIABLE SPEED DEVICE
Filed Nov. 19, 1931  4 Sheets-Sheet 3
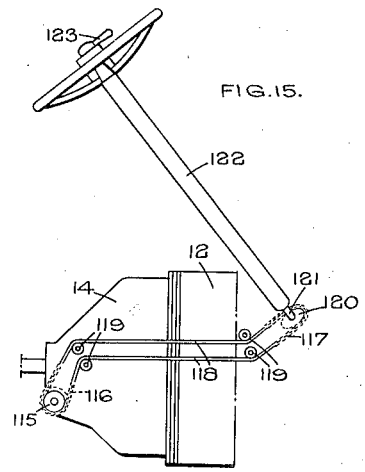
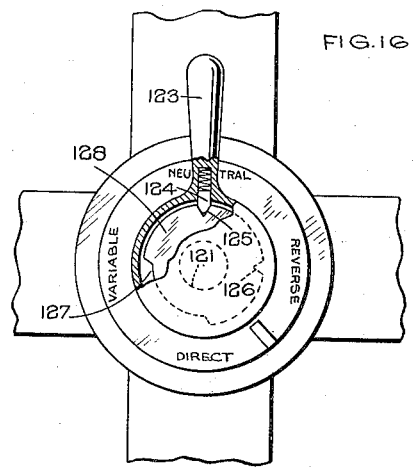
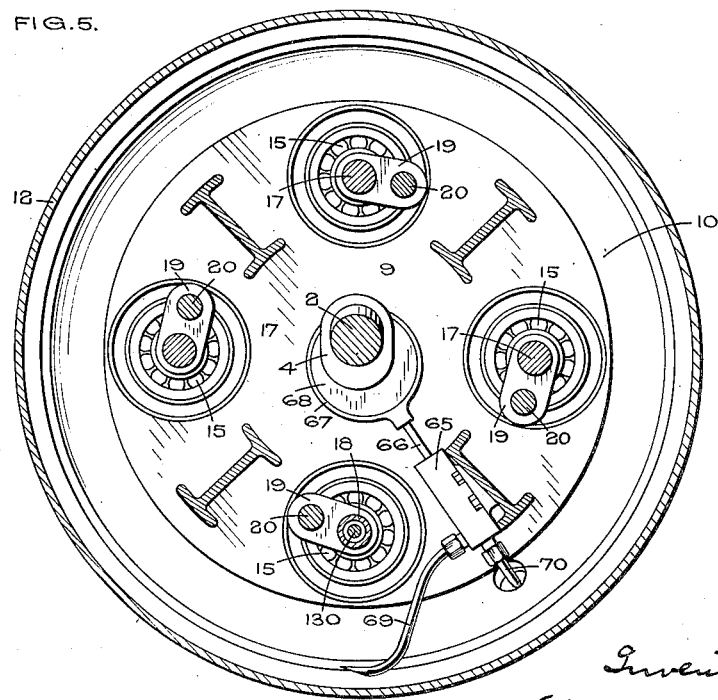
Inventor:
Edward E. Guinness
by Richard E. Babcock
Attorney March 14, 1933.    E. E. GUINNESS    1,901,098
VARIABLE SPEED DEVICE
Filed Nov. 19, 1931    4 Sheets-Sheet 4
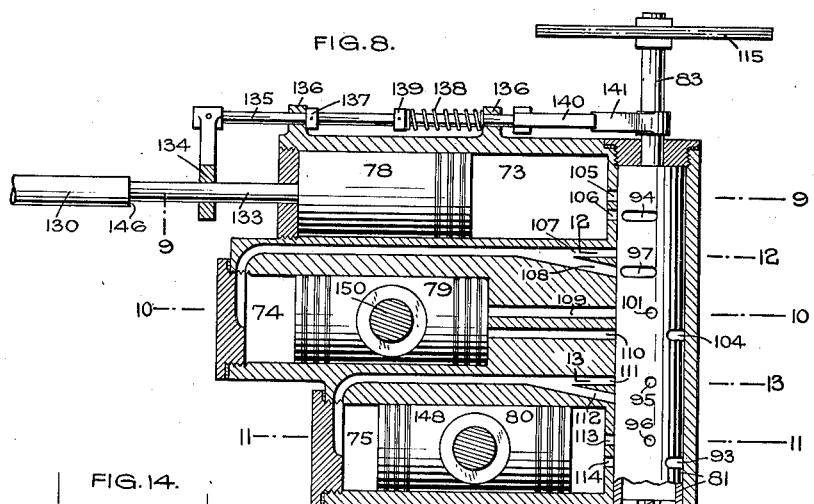
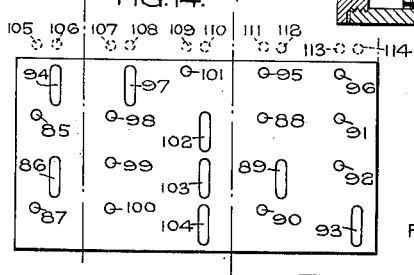
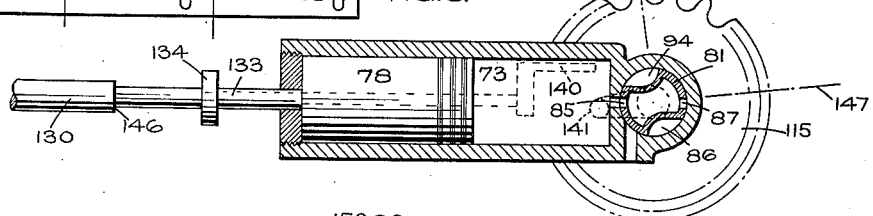
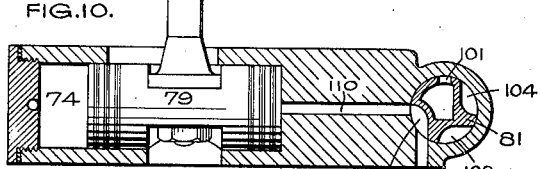
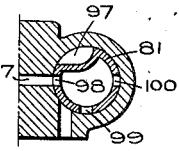
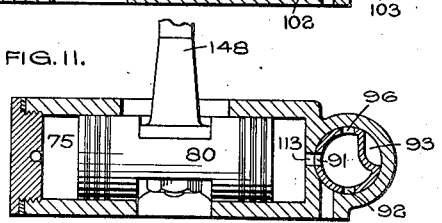
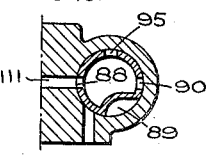
Inventor:
Edward E. Guinness
by Richard E. Babcock
Attorney Patented Mar. 14, 1933

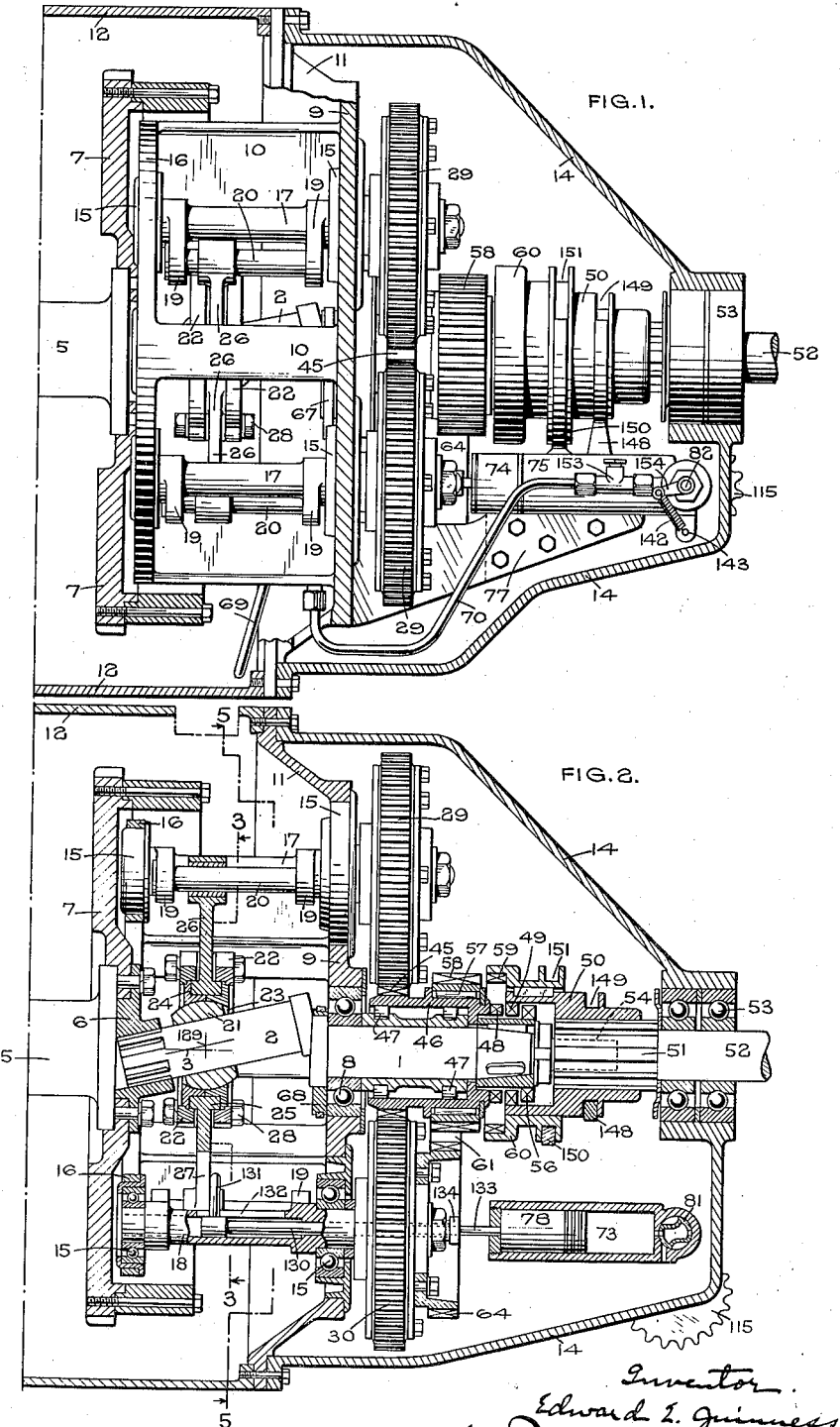

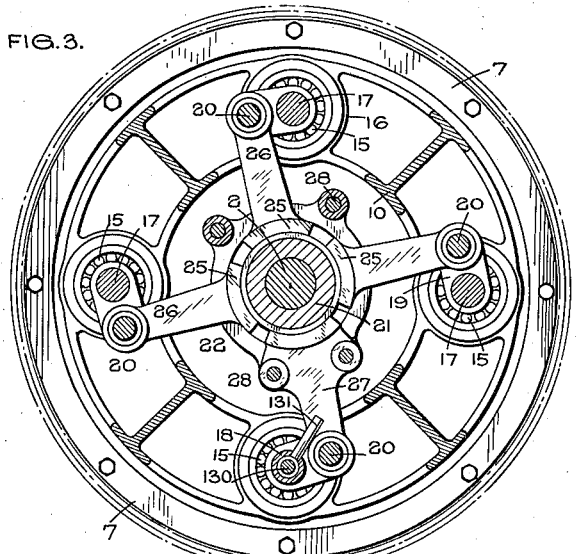

1,901,098

UNITED STATES PATENT OFFICE

EDWARD EWART GUINNESS, OF REDNAL, NEAR BIRMINGHAM, ENGLAND, ASSIGNOR OF ONE-EIGHTH TO HUBERT HUMPHREYS, OF BIRMINGHAM, ENGLAND

VARIABLE SPEED DEVICE

Application filed November 19, 1931, Serial No. 576,167, and in Great Britain July 29, 1931.

This invention concerns variable speed gear of the kind having a variable throw device adapted to operate one or more rocking shafts, each associated with and actuating one way clutch mechanism adapted to impart rotary motion to a driven shaft or member, and the invention particularly relates to mechanism of this kind in which the variable throw device comprises a crank shaft having a crank pin inclined to its axis, and a member freely slidable on said crank pin and in which the latter can turn freely and carrying one or more connecting rods by which motion is imparted to said rocking shaft or shafts.

The primary object of this invention is to provide a variable speed gear of the kind specified of generally improved form.

A further object of the invention is to provide in a variable speed gear of the said kind a more efficient drive between the rocking shafts and the driven shaft or member.

A still further object of the invention is to provide suitable controls for the improved variable speed gear.

Another object of the invention is to reduce wear and tear in a variable speed gear of the particular kind referred to.

A further object of the invention is to improve the power transmission between the driving shaft and the rocking shafts.

A further object of the invention is to provide an improved assembly of the mechanism of variable speed gear of the kind referred to.

Referring to the drawings:—

Figure 1 is a part sectional side elevation of a variable speed gear constructed in accordance with this invention and particularly adapted for motor driven vehicles, the section being taken through the crank and gear cases on line 1—1, Figure 4.

Figure 2 is a part vertical sectional view of the same gear, the section being taken on line 2—2, Figure 4.

Figure 3 is a sectional view of the same gear, the section being taken on line 3—3, Figure 2.

Figure 4 is a rear end view of the same variable speed gear, the gear case being removed.

Figure 5 is a sectional view of the same variable speed gear, the section being taken on line 5—5, Figure 2.

Figure 6 is a sectional view of one of the free wheels of the variable speed gear, the section being taken on line 6—6, Figure 4, and the view being drawn to an enlarged scale.

Figure 7 is a side view of the same free wheel, a part of the latter being broken to show details.

Figure 8 is a sectional plan view of hydraulic control cylinders for the variable speed gear, the section being taken on line 8—8, Figure 4.

Figures 9, 10, and 11 are longitudinal sections taken on lines 9—9, 10—10, and 11—11, Figure 8, and show the neutral positions of the pistons and valves controlling the admission of actuating fluid to the right hand ends of the three hydraulic control cylinders, all the ports being shown, in these sections, as being in the same plane to avoid multiplicity of figures and for the sake of clearness.

Figures 12 and 13 are sections on lines 12—12, and 13—13 Figure 8, and show the neutral positions of the valve ports controlling the admission of actuating fluid to the left hand ends of the cylinders shown in Figures 10 and 11, all the ports are shown in a single plane.

Figure 14 is a developed view of the valve ports of the control valve of the hydraulic control.

Figure 15 is a general view showing a method of actuating said control valve from the steering wheel of a motor driven vehicle.

Figure 16 is a detail of the same drawn to an enlarged scale.

The variable speed gear illustrated in the accompanying drawings is constructed in accordance with a preferred form of this invention and comprises a crank shaft 1 having a crank pin 2 inclined to its axis, the axes of the crank shaft and crank pin intersecting at a point 3. One end of the crank pin 2 is fixed to the crank shaft 1 by a crank web 4 and the other end of the crank pin is fixed to the engine shaft 5.

The engine shaft end of the crank pin 2 is splined and fits into a correspondingly splined flanged collar 6 bolted to the inside of the fly wheel 7 and to the engine shaft, the same bolts serving to fix the said flanged collar and the fly wheel to the engine shaft.

The crank shaft 1 is mounted in a ball race 8 centrally disposed in the rear end member 9 of a bearing carrying frame 10 provided with a conical flange 11 by which it is bolted to the crank case 12 by bolts 13 also securing a gear case 14 to the crank case.

Around the crank shaft 1 and parallel thereto, and mounted in bearings 15 carried in the front and rear end members 9 and 16 of the bearing carrying frame 10, are arranged four rocker shafts three of which are marked 17 and the fourth of which is marked 18 in the drawings. These rocker shafts are each free to oscillate in their bearings 15 and each have crank arms 19 and a crank pin 20, the axis of which is parallel to the axis of the rocker shaft. The rear ends of the rocker shafts project through the rear end member 9 of the frame 10 for the purpose hereinafter described.

An inner collar 21 having a spherical outer surface is mounted on the inclined crank pin 2 and is freely slidable thereon whilst the crank pin is freely turnable in the collar. An outer collar 22 is mounted on the said inner collar and the outer collar has a central aperture 23 having a spherical surface so that the inner collar is free to move angularly in the outer collar and yet the outer collar 22 is bound to travel longitudinally with the inner collar.

The outer collar 22 is formed in two similar but opposed parts bolted together and provided with an annular guide 24 in which are free to slide the slippers 25 of three connecting rods 26 respectively connecting the crank pins 20 of the rocker shafts 17 to the outer collar 22. A fourth and master connecting rod 27 is rigidly bolted at its inner end to the outer collar 22 by bolts 28 and the outer end of the master connecting rod 27 is connected to the crank pin 20 of the rocker shaft 18. Whilst the connecting rods 26 and 27 are free to make slight angular movements relative to the outer collar 22 they cannot move radially, or in the direction of their length, relative to the outer collar.

On the rear end of each of the rocker shafts 17 is mounted a free wheel or one way clutch generally designated by the reference 29 whilst a similar free wheel 30 is mounted on the rear end of the rocker shaft 18. The free wheels 29 and 30 are all constructed alike and are illustrated in detail in Figures 6 and 7 from which it will be seen that each free wheel or one way clutch comprises two spaced disc like end plates 31 and 32 mounted on antifriction bearings 33, 34 carried by the rocker shaft on which the friction wheel is mounted.

A ring 35 having external spur teeth 36 is secured by studs 37 between the end plate 31 and 32 of the free wheel and is therefore practically speaking, solid with the end plates. Each end plate is provided with an annular recess 38 for a purpose to be described shortly.

Between the end plates 31 and 32 of the free wheel is disposed a driving disc 39 keyed to a tapered portion 40 of the rocker shaft of the free wheel and the disc 39 is provided with conical annular side faces 41 and 42 which are disposed opposite the annular recesses 38 in the end plates 31, 32 respectively. Conical or tapered rollers 43 are disposed in the annular recesses 38 and bear against the conical faces 41 and 42 of the driving disc 39.

The annular conical faces 41 and 42 of the driving disc 39 are provided with successively arranged wedge like surfaces 44 conveniently radially disposed and in the form of short inclined planes (see Figure 7) and these wedge surfaces, and those on the corresponding faces of the driving discs 39, of all the free wheels, all incline in the same direction and the arrangement is such that as the driving disc 39 is rotated in one direction the tapered rollers 43 are wedged between the wedge surfaces 44 and the bases of the recesses 38 in the end plates 31, 32 of the free wheel so that the latter and the toothed ring 35 are bound to revolve with the driving disc. Rotation of the driving disc in the opposite direction does not wedge the rollers 43 and therefore the toothed ring 35 is not affected but remains stationary.

The teeth 36 of all the free wheels 29, 30, mesh with annularly arranged spur teeth 45 on a driven sleeve 46 mounted on anti-friction bearings 47 and around and concentric with the crank shaft 1. Thus a one way drive can be transmitted to the sleeve 46 from the toothed rings 35 of the free wheels 29, 30.

The sleeve 46 is provided at its rear end with dogs 48 and these dogs are engageable by dogs 49 carried on the front end of an inner dog clutch 50 slidably mounted upon splines 51 on a propeller or tail shaft 52 mounted in antifriction bearings 53 carried by the gear case 14. The tail shaft 52 is coaxial with the crank shaft 1 and a spigot 54 on the rear end of the crank shaft takes a seat in the forward end of the tail shaft. Sliding the inner dog clutch 50 forwardly engages the dogs 49 with the dogs 48 and provides a driving connection between the driven sleeve 46 and the tail shaft 52 whilst when the inner dog clutch 50 is in the position shown in Figure 2 of the drawings no drive is effected.

Keyed to the rear end of the crank shaft 1, which is conveniently tapered at this part, is a fixed sleeve 55 having dogs 56 disposed so that they can be engaged with the dogs 49 of the inner dog clutch 50 when the latter is slidden rearwardy. In this manner the tail shaft 52 can be connected to the crank shaft 1 in direct driving engagement.

Rotatably mounted on antifriction bearings 57 arranged around the outside of the driven sleeve 46 is an annular gear wheel 58 which is engageable by dogs 59 of an outer dog clutch 60 slidably but nonrotatably keyed on the inner dog clutch 50, normally the outer dog clutch 60 does not engage the annular gear wheel 58 but may be slidden forwardly into engagement therewith whereby any movement transmitted to the annular gear wheel is imparted through the outer and inner dog clutches 60 and 50 to the tail shaft 52.

The annular gear wheel 58 is driven through an intermediate reverse wheel 61 mounted freely on a spindle 62 (Figure 4) bearing in a bracket 63. The intermediate reverse wheel meshes with a toothed reverse wheel 64 concentrically and rigidly bolted to the rear end plate 32 of the free wheel 30. Thus the annular gear wheel 58 rotates in an opposite direction to the driven sleeve 46 and the reverse drive is transmitted to the tail shaft by the outer clutch 60 as before described.

The control mechanism for making and breaking the driving connection between the inner dog clutch 50 and the driven sleeve 46; and the making and breaking of the direct drive connection between the fixed sleeve 55 on the crank shaft and the inner dog clutch 50; and the making and breaking of the reverse drive may be effected by any suitable mechanism either mechanical or hydraulic and an example of a hydraulic control is illustrated and will now be described.

The control mechanism comprises a pump 65 and is secured to the bearing frame 10 and having a piston reciprocated by a piston rod 66 attached to an eccentric band 67 working on an eccentric 68 fixed on or forming a part of the crank shaft web 4 (see Figures 2 and 5 particularly). The pump 65 is provided with an inlet pipe 69 projecting into the base or well of the crank case 12 and adapted to withdraw oil from a supply in the base of the crank case and feed it by means of a feed pipe 70 (provided with a safety valve 153) to a cylindrical valve chamber 71 (see Figures 8 to 13) through an inlet port 72. In communication with the valve chamber 71 are three cylinders hereinafter referred to as the connecting rod returning cylinder 73, the reverse control cylinder 74, and the variable and direct gear control 75.

The cylinders and valve chamber just described are mounted by a bracket 76 on a web 77 carried by the bearing frame 10.

Figures 8 to 13 show all the parts in what is termed the "neutral" position of the gear, that is the position in which, although the engine may be working, no drive is being transmitted to the tail shaft.

In the cylinder 73 works a single acting piston 78, in the cylinder 74 works a double acting piston 79 and in the cylinder 75 works a further double acting piston 80.

In the valve chamber 71 is mounted a rotatable hollow cylindrical valve 81 carried by trunnions 82, 83 or a single shaft and communicating by passages 84 with the inlet end of the valve chamber 71.

Figure 14 shows a developed view of the valve and the valve is provided with ports arranged as shown in this developed view and in Figures 9 to 13 and the ports in the valve are respectively referenced 85 to 104.

The connecting rod return cylinder 73 is provided at the valve chamber end with an inlet port 105 and an exit port 106; the cylinder 74 is provided with an inlet port 107 and exit port 108 both communicating with the left hand end of the cylinder and also with an inlet 109 and exit port 110 communicating with the right hand end of the cylinder; similarly the cylinder 75 is provided with an inlet port 111 and an exit port 112 communicating with the left hand end of the cylinder and an inlet port 113 and an outlet port 114 communicating with the right hand end of the cylinder. The expressions "left hand end" and the "right hand end" of the cylinder mean respectively that end of the cylinder remote from the valve chamber and that end of the cylinder adjacent the valve chamber.

On the trunnion 83 of the rotary valve 81 is fixed a sprocket wheel 115 and over this sprocket wheel passes an endless flexible driving member (see Figure 15) comprising two lengths 116 and 117 of chain the ends of which are joined together by two lengths of wire cable 118. The cables 118 pass over guide pulleys 119 and the chain 116 passes over the sprocket 115 whilst the chain 117 passes over a sprocket 120 fixed on the lower end of a shaft or spindle 121 passing up the driving column 122 of the vehicle and carrying at its upper end an operating handle 123 (see Figures 15 and 16) by which the rotary valve 81 is controlled.

The operating handle 123 carries a spring pressed stop 124 which is adapted to engage in any of three notches 125, 126, and 127 provided in a plate 128 rigidly associated with the steering column 122 or a part thereof. The notch 127 is elongated and extends slightly more than a quarter of the circumferential length of the plate 128.

When the handle 123 is in the position shown in Figure 16 the rotary valve 81 is in the neutral position. On turning the handle 123 in an anticlockwise direction into the position marked "variable" the spring stop 124 engages the notch 127 in the plate 128, the handle is then free to move into the position marked "direct" automatically as hereinbefore will be described. When it is desired to effect a reverse gear the handle 123 is turned back to the neutral position and then through 90° so that the stop 124 engages in the notch 126 in the plate 128.

It is not practicable to have the center 129 of the inner collar 21 on the point 3 of intersection of the axes of the crank shaft 1 and the crank pin 3 because on the crank shaft commencing to rotate it would be difficult or perhaps even impossible to move the inner collar along the crank pin. It is desired that as the speed of the crank shaft increases the inner collar 21 and the parts carried thereby should ride rearwardly (i. e. away from the engine shaft) on the crank pin and the arrangement is such that a center 129 of the inner collar is disposed on the axis of the crank pin 2 slightly to the rear of the point of intersection 3. In this position of the inner collar 21 there is a slight tendency for the inner collar and the parts connected thereto to slide up the crank pin even when the engine is rotating slowly.

The purpose of the cylinder 73 and piston 78 previously referred to is partially that of retaining the collar 21 and the parts connected thereto in the neutral position 129 when the control handle 123 is in the neutral position and the engine shaft is revolving comparatively slowly. This holding of the said parts is attained by a rod 130 slidably mounted in the rocker shaft 18 which is for this purpose made hollow (see particularly Figures 2, 3, and 8). The front end of the rod 130 carries a laterally projecting pin 131 which passes through a longitudinal slot 132 provided in the rocker shaft 18 and engages the rear surface of the master connecting rod 28. The other end of the rod 130 has a portion 133 of reduced diameter which passes through an opening in the left hand end of the cylinder 73 and abuts the left hand end of the piston 78. The reduced portion 133 also passes freely through an arm 134 carried upon a rod 135 slidably mounted in brackets 136 on the cylinder 73.

The rod 135 is provided with a collar 137 and is normally retained with this stop engaging the left hand bearing 136 by means of a spring 138 mounted on the rod and abutting the right hand bearing 136 and a collar 139 fixed on the rod.

The right hand end of the rod 135 carries a finger piece 140 which is adapted to engage a lever 141 fixed on the trunnion 83 of the rotary valve 81, the lever 141 is shown clearly in Figures 8 and 9.

On the valve trunnion 82 is fixed a lever 154 to which is connected one end of a spring 142 having its other end anchored to a fixed pin 143.

When the valve 81 is moved into the position referred to as the variable position and indicated by the dotted line (Figure 9) the lever 141 occupies the position indicated by the dotted line 145 (Figure 9). As the speed of the engine shaft increases the rod 130 is slid axially rearwardly and the finger 140 is also slid rearwardly due to the engagement of the shoulder 146 of the rod 130 engaging the arm 134. The finger 140 thus engages the lever 141 and pushes it over a dead center position after which the spring 142 pulls the lever 141 into a position indicated by a dotted line 147 which corresponds with the direct drive position of the hand lever 123 and the rotary valve 81, the automatic movement of the valve and the operating handle 123 from the variable position to the direct being unimpeded by the spring stop 124 (Figure 16) as this rides freely in the elongated notch 127 of the plate 128.

When the engine is running slowly and the operating handle 123 is in the neutral position the piston 78 is retained at the left hand end of the cylinder 73 to retain the rod 130 in its outermost position in which it retains the connecting rod mechanism in the neutral position 129.

The piston is retained in the left hand end of its cylinder by oil pumped into the valve chamber 71 under pressure as before described and passing along the interior of the rotary valve 81 and through the inlet port 85 of the valve and the inlet port 105 of the cylinder into the right hand end of the cylinder 73.

Assuming the engine shaft 5 to be revolving slowly, then if it is desired to put the tail shaft 52 in driving connection with the variable gear driven sleeve 46 the operating lever 123 is rotated in an anticlockwise direction until the lever is in the position marked variable (Figure 16) and the spring stop 124 engages in the front end of the elongated slot 127 of the plate 128. This effects the rotation of the rotary valve 81 and brings the exhaust port 86 of the valve opposite the exhaust port 106 of the cylinder 73 and thus permits the piston 78 to be pushed towards the right hand end of the cylinder by the rod 130 as the engine shaft speed increases and the inner collar 21 and the connecting rods carried thereby ride up the crank shaft and the speed of the driven sleeve 46 increases due to the increased throw of the crank pin 2, the increased oscillations of the rocker shafts 17, 18 and the increased angular movement of the free wheel teeth 36. Simultaneously with the movement of the exhaust port 86 of the valve opposite the exhaust port 106 of the cylinder 73 the inlet port 105 of the cylinder 73 is closed.

In the neutral position of the valve the inlet ports 88 and 91 of the valve communicate with the inlet ports 111 and 113 respectively of the cylinder 75 and in this way the piston 80 is maintained at the center of the cylinder and the inner sliding dog clutch 50 is maintained in a neutral position through a selector fork 148 carried by the piston 80 and engaging in the annular groove 149 in the clutch 50.

When the valve 81 is moved into the variable position the inlet port 111 of the cylinder 75 is closed and the exhaust port 112 of the cylinder is opened, the exhaust port 89 of the valve being opposite the port 112. The inlet port 113 of the cylinder remains open, the inlet port 92 of the rotary valve being brought opposite the cylinder inlet port. Therefore the piston 80 moves to the left and carries, through its fork, the dog clutch 50 into driving engagement with the driven sleeve 46 and thus the variable speed drive is transmitted to the tail shaft.

As the speed of the engine increases the trunnion 83 of the valve 81 is rotated by the rod 130 through the finger 140 as previously described until the overdead center position of the lever 141 is reached when the valve is quickly moved into the position referred to as the direct position and in which position a direct drive is effected between the crank shaft and the tail shaft.

When the direct position of the valve 81 is attained it is desired that the inner collar 21, outer collar 22, and connecting rods 26, 27 should be returned to their neutral position so as to minimize wear and tear on these parts and of the free wheels or one way clutches 29, 30. At the same time it is desired to move the dog clutch 50 out of engagement with the driven sleeve 46 and to engage the dog clutch with the dogs 56 of the fixed sleeve 55.

The latter operation is effected by bringing the inlet port of the valve 81 opposite the inlet port 111 of the cylinder 75 and bringing the exhaust port 93 of the valve 81 opposite the exhaust port 114 of the cylinder 75 so that the right hand end of the cylinder is exhausted and the actuated fluid is forced into the left hand end of the cylinder and the piston moves to the right. The same movement effects the closing of the inlet valve 113 and the closing of the exhaust valve 112. The initial part of the right hand movement of the piston 80 disengages the dog clutch 50 from the sleeve 46 whilst the final portion of the right hand movement of the piston engages the dog clutch with the dogs 56 and a direct drive from the crank shaft 1 to the tail shaft 52 is effected.

The return of the connecting rod mechanism to its neutral position is attained by the closing of the exhaust valve 106 of the cylinder 73 and the bringing of the inlet port 87 of the rotary valve opposite the inlet port 105 of the cylinder 73 whereby the piston 78 is moved to the left and the rod 130 is also moved to the left together with the connecting rod mechanism on which the rod acts.

During the various operating lever positions previously described the inlet ports 98, 99, and 100 of the rotary valve were successively opposite the inlet port 107 of the reverse cylinder 74 whilst the exit ports 102, 103, and 104 of the rotary valve 81 were successively opposite the exit port 110 of the same cylinder and thus the piston 79 was retained in the right hand position whereby the outer dog clutch 60 was maintained out of engagement with the reverse drive through a selector fork 150 carried by the piston 79 and engaging in a groove 151 in the outer dog clutch.

To effect the reversal of the tail shaft the outer dog clutch 59 has to be moved into engagement with the annular gear wheel 58 and this is effected by rotating the operating lever 123 in a clockwise direction to the reverse position when the inlet port 101 of the valve registers with the inlet port 109 of the reverse cylinder 74, the exhaust port 110 of this cylinder is closed and the inlet port 107 of the same cylinder is also closed whilst the exit port 108 is open and registers with the exit port 97 of the valve 81 whereby the piston 79 is pushed to the left and the outer clutch 60 is engaged with the reverse annular gear wheel and the reverse drive is effected.

When the reverse gear is engaged it is necessary to release the connecting rod mechanism so that it may move along the crank pin as the engine speed is increased and for this purpose when the valve 81 is moved into a position for operating the outer dog clutch to effect the drive the exhaust port 106 of the cylinder 73 is opened and the inlet port 105 is closed.

The free wheel or one way clutch wheel described has a large effective frictional contacting area between the tapered rollers 43 and the driven end plates 31, 32 and the driving disc 39 and the employment of a number of driving free wheels of this kind ensures a highly efficient transmission of power from the rocker shafts to the driven member.

Furthermore the use of the slipper type of connecting rods 26, 27 described and illustrated eliminates much wear and tear that is associated with ordinary pivoted connecting rods and also saves considerable power that is lost when using the pivoted type of connecting rod.

A further advantage of the apparatus according to this invention lies in the provision of the bearing carrying frame 10 in which a considerable part of the mechanism can be mounted prior to the placing of the frame in the crank case 12 and thus time is saved and the difficulties of erecting the apparatus is reduced to a minimum.

I claim:—

A variable speed gear of the kind specified and comprising, a driving member in the form of a crank shaft having a crank pin inclined to its axis, a collar slidable on said crank pin and in which the latter may turn freely, connecting rods carried by said collar, rocker shafts arranged adjacent said crank shaft and to which said connecting rods are connected respectively, a variable speed driven member one way clutch mechanism adapted to transmit a one way drive to said variable speed driven member from said rocker shafts and means adapted to return said connecting rod mechanism from its maximum throw to its minimum throw position, such means comprising a push rod axially slidable in one of said rocker shafts which is made hollow for this purpose, a projection on said push rod extending through a longitudinal slot provided in the said hollow rocker shaft and abutting the connecting rod associated with the said rocker shaft, and means associated with said push rod and adapted to slide the push rod axially to return said connecting rod mechanism to the minimum throw position.

In witness whereof I affix my signature.

EDWARD EWART GUINNESS.